(12) United States Patent
Uby

(10) Patent No.: US 10,273,173 B2
(45) Date of Patent: Apr. 30, 2019

(54) METHOD OF CONTROLLING A CIRCULATION-TYPE WASTEWATER TREATMENT PLANT VIA A STORED PARAMETER RELATIONSHIP IN A CONTROL UNIT

(71) Applicant: XYLEM IP MANAGEMENT S.À R.L., Senningerberg (LU)

(72) Inventor: Lars Uby, Spånga (SE)

(73) Assignee: XYLEM IP MANAGEMENT S.À R.L., Luxembourg (LU)

( * ) Notice: Subject to any disclaimer, the term of this patent is extended or adjusted under 35 U.S.C. 154(b) by 120 days.

(21) Appl. No.: 15/318,444

(22) PCT Filed: Jun. 15, 2015

(86) PCT No.: PCT/IB2015/054499
§ 371 (c)(1),
(2) Date: Dec. 13, 2016

(87) PCT Pub. No.: WO2015/193783
PCT Pub. Date: Dec. 23, 2015

(65) Prior Publication Data
US 2017/0144909 A1 May 25, 2017

(30) Foreign Application Priority Data
Jun. 17, 2014 (SE) ...................................... 1450755

(51) Int. Cl.
*C02F 3/00* (2006.01)
*C02F 3/12* (2006.01)
(Continued)

(52) U.S. Cl.
CPC .......... *C02F 3/006* (2013.01); *B01F 3/04765* (2013.01); *B01F 3/04773* (2013.01);
(Continued)

(58) Field of Classification Search
None
See application file for complete search history.

(56) References Cited

U.S. PATENT DOCUMENTS

| 4,280,910 A | 7/1981 | Baumann |
| 6,224,752 B1 * | 5/2001 | Drewery ................. C02F 3/006 |
| | | 210/150 |

(Continued)

FOREIGN PATENT DOCUMENTS

| DE | 2706078 | 8/1978 |
| GB | 2080276 | 2/1982 |

(Continued)

OTHER PUBLICATIONS

Singapore Written Opinion with International Search Report for International Application No. 11201610562U, dated Jan. 18, 2018, 7 pages.

(Continued)

*Primary Examiner* — Hayden Brewster
(74) *Attorney, Agent, or Firm* — RatnerPrestia

(57) ABSTRACT

A plant and method for controlling such a plant suitable for treatment of waste water. The plant includes a basin, a flow generating machine adapted to generate a liquid flow in the basin, equipment in the basin that effects the momentum of the liquid flow, and a control unit. The method includes the steps of: storing a predetermined relationship between the operational speed N of the flow generating machine and an operational parameter P from which the torque M of the flow generating machine may be derived, determining the operational speed N, determining a set value of the operational parameter P of the flow generating machine, determining a real value of the operational parameter P of the flow generating machine, and adjusting the operational speed N if the (Continued)

real value of the operational parameter P is different than the set value of the operational parameter P.

10 Claims, 3 Drawing Sheets

(51) Int. Cl.
*B01F 5/10* (2006.01)
*B01F 3/04* (2006.01)

(52) U.S. Cl.
CPC .............. *B01F 5/102* (2013.01); *B01F 5/104* (2013.01); *C02F 3/1257* (2013.01); *C02F 3/1284* (2013.01); *B01F 2215/0052* (2013.01); *C02F 2209/006* (2013.01); *C02F 2209/22* (2013.01); *C02F 2209/40* (2013.01); *Y02W 10/15* (2015.05)

(56) References Cited

U.S. PATENT DOCUMENTS

2007/0154320 A1 7/2007 Stiles
2013/0256225 A1 10/2013 Leland

FOREIGN PATENT DOCUMENTS

| | | |
|---|---|---|
| JP | S5993798 U | 6/1984 |
| JP | 11104684 A | 4/1999 |
| JP | 11216487 | 8/1999 |
| JP | 2002320994 A | 11/2002 |
| JP | 2003334593 A | 11/2003 |
| JP | 2008246483 A | 10/2008 |
| JP | 2012143696 A | 8/2012 |

OTHER PUBLICATIONS

Notice of Reasons for Rejection for Japanese Application No. 2016-573735, dated Mar. 15, 2018, including English translation, 16 pages.
International Search Report and Written Opinion for International Application No. PCT/IB2015/054499, dated Sep. 4, 2015, 9 pages.
International Preliminary Report on Patentability for International Application No. PCT/IB2015/054499, dated Aug. 9, 2016, 6 pages.
Written Opinion of the International Preliminary Examining Authority, dated May 12, 2016 for International Application No. PCT/IB2015/054499, 12 pages.
International-Type Search Report for ITS/SE14/00277, dated Dec. 16, 2014, 4 pages.

* cited by examiner

METHOD OF CONTROLLING A CIRCULATION-TYPE WASTEWATER TREATMENT PLANT VIA A STORED PARAMETER RELATIONSHIP IN A CONTROL UNIT

CROSS-REFERENCE TO RELATED APPLICATIONS

This patent application is a U.S. National Phase Patent Application of PCT Application No. PCT/IB2015/054499, filed Jun. 15, 2015, which claims priority to Swedish Patent Application No. 1450755-27, filed Jun. 17, 2014, both of which are incorporated by reference herein in their entirety.

TECHNICAL FIELD OF THE INVENTION

The present invention relates in general to a plant and a method for controlling a plant for treatment of liquid, especially biological treatment of liquid. The present invention relates especially to a plant and a method for controlling a plant suitable for treatment of liquid such as waste water, wherein the plant comprises a basin configured to house a liquid, at least one flow generating machine arranged in the basin and configured to generate a liquid flow in the basin, at least one equipment that is arranged in the basin and that effects the momentum of the liquid flow, and a control unit that is operatively connected to said at least one flow generating machine.

BACKGROUND OF THE INVENTION AND PRIOR ART

A circulation channel, or a ring channel, is usually an upwardly open endless basin that is used during biological treatment or oxidation of liquid, especially waste water. The waste water/liquid is made to flow along the circulation channel and is thereby made to pass different zones in the circulation channel.

During such biological treatment the waste water is usually purified from nitrogen and biological material by having micro organisms breaking down the biological material into carbon dioxide and water, and by having bacteria transforming the water bound nitrogen to aerial nitrogen. Purified waste water is released into the nature and in the case the water bound nitrogen is not eliminated there is a risk for eutrophication in the natural watercourses, and due to the fact that the biological material is consuming considerable amounts of oxygen watercourses deficient in oxygen are generated if insufficiently purified water is released. The breaking down of the biological material is stimulated by adding large amounts of oxygen to the waste water by means of one or more aeration sectors, and the elimination of the water bound nitrogen takes place in the circulation channel in areas without added oxygen or in separate basins without added oxygen and/or in areas/basins in which the dissolved oxygen level is low enough.

In one, or a few, locations along the circulation channel oxygen is supplied to the waste water by means of mechanical surface aerators, bottom located aerator sections, jet aerators, etc. The micro organisms in the so-called activated sludge consume the oxygen in order to break down the biological material present in the waste water, as well as possibly for nitrification of inter alia ammonium nitrate.

Flow generating machines/mixer machines are used in circulation channels in order to mix the liquid/waste water in order to obtain an as homogenous liquid mixture as possible, keeping the biological material suspended, as well as generating a liquid flow circulating/flowing along the circulation channel.

In some known processes of liquid treatment it is requested that the liquid flow speed along the circulation channel is kept at a predetermined constant level. In a theoretical circulation channel having only one flow generating machine and homogenous liquid, this is easily fulfilled by operating the flow generating machine at a constant operational speed. However, in reality the liquid is not homogenous over time and thereto the treatment plant comprises equipment that are arranged in the circulation channel and that effect the momentum of the flowing liquid in positive direction or in negative direction. A change in the momentum of the liquid flow entails that the speed of the liquid flow is effected/changed. The effect of these equipment may also be variable over time due to varying operation. Based on the fact that the status of the incoming waste water is changed over time, the amount of added oxygen must also be modified over time, and modified intensity entails that the speed of the liquid flow is effected.

The changing speed of the liquid flow may be compensated by revising the operational speed of the flow generating machine, however, this demands for the speed of the liquid flow being monitored by means of expensive speed sensors that are susceptible to disturbances and require regular maintenance.

OBJECT OF THE INVENTION

The present invention aims at improving previously known methods for controlling treatment plants with the object of reducing the costs for the operation of the treatment plant and thereby providing an improved method for controlling a treatment plant suitable for treatment of liquid. A basic object of the invention is to provide an improved method of initially defined type, which entail that a constant speed of the liquid flow can be achieved without the need for external speed sensors. External speed sensors suffer from the drawbacks that they are expensive and require monitoring and maintenance as they are susceptible to disturbances and thereby risk to provide incorrect information.

BRIEF DESCRIPTION OF THE INVENTION

According to the invention at least the basic object is obtained by means of the initially defined method, having the features defined in the independent claim. Preferred embodiments of the present invention are further defined in the dependent claims.

According to a first aspect of the present invention it is provided a method of the initially defined type, which method is characterized be the steps of in the control unit storing a predetermined relationship between the operational speed N of the flow generating machine and an operational parameter P from which the torque M of the flow generating machine may be derived, which relationship depends on a predetermined liquid flow speed V in the basin at the flow generating machine, determining the operational speed N of the flow generating machine, from the determined operational speed N determining a set value of the operational parameter P of the flow generating machine based on said relationship between the operational speed N of the flow generating machine and the operational parameter P of the flow generating machine, by means of the control unit determining a real value of the operational parameter P of the flow generating machine, and by means of the control unit adjusting the operational speed N of the flow generating machine if the real value of the operational parameter P of the flow generating machine is different than the set value of the operational parameter P of the flow generating machine.

According to a second aspect of the present invention it is provided a plant of the initially defined type, which is characterized in that the control unit comprises a predetermined relationship between the operational speed N of the flow generating machine and an operational parameter P from which the torque M of the flow generating machine may be derived, which relationship depends on a predetermined liquid flow speed V in the basin at the flow generating machine, the control unit being configured to determine from a given operational speed N a set value of the operational parameter P of the flow generating machine based on said relationship between the operational speed N of the flow generating machine and the operational parameter P of the flow generating machine, determine a real value of the operational parameter P of the flow generating machine, and adjust the operational speed N of the flow generating machine if the real value of the operational parameter P of the flow generating machine is different than the set value of the operational parameter P of the flow generating machine.

Thus, the present invention is based on the understanding that by monitoring the operational speed of the flow generating machine and an operational parameter P from which the torque M may be derived, a predetermined speed of the liquid flow may be obtained with the need of external speed sensors.

According to a preferred embodiment of the present invention the basin is constituted by a circulation channel, wherein said at least one flow generating machine is configured to generate a liquid flow along the circulation channel.

According to a preferred embodiment of the present invention, the operational speed N of the flow generating machine shall be increased if the true value of the operational parameter P of the flow generating machine is greater than the set value of the operational parameter P of the flow generating machine, and be decreased if the true value of the operational parameter P of the flow generating machine is less than the set value of the operational parameter P of the flow generating machine.

According to a preferred embodiment of the present invention, said at least one equipment is constituted by a mechanical surface aerator, especially a mechanical surface aerator comprising a horizontal rotational axis.

According to a preferred embodiment of the present invention, the operational parameter P is constituted by the current I that the flow generating machine consume.

Other advantages with and features of the invention will be apparent from the other dependent claims as well as from the following, detailed description of preferred embodiments.

BRIEF DESCRIPTION OF THE DRAWINGS

A more complete understanding of abovementioned and other features and advantages of the present invention will be apparent from the following, detailed description of preferred embodiments with reference to the appended drawings, in which.

DETAILED DESCRIPTION OF THE INVENTION

Figure 1:
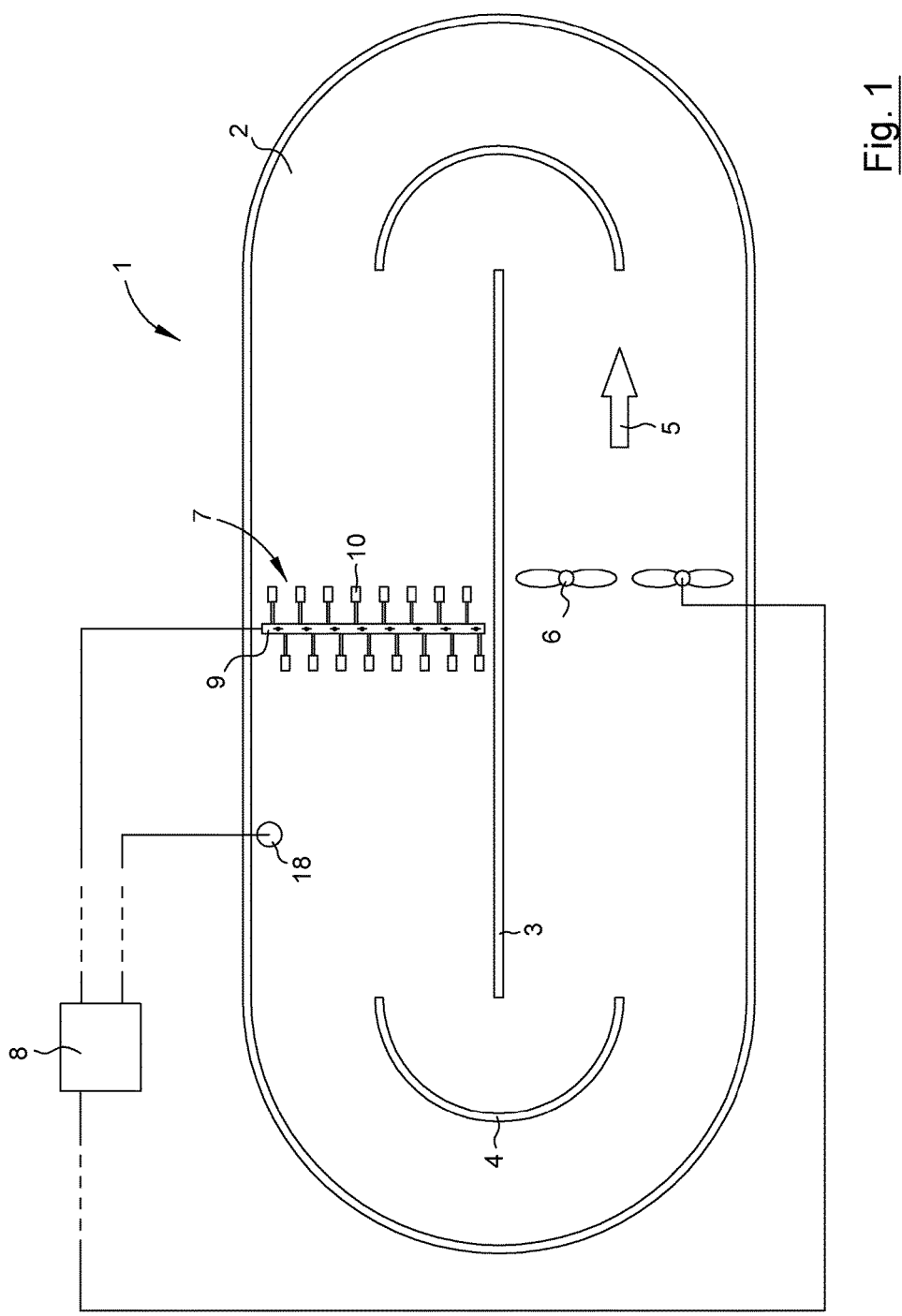
FIG. 1 is a schematic illustration of an inventive plant according to a first embodiment.

Reference is initially made to FIG. 1. The present invention relates to a plant, generally designated 1, suitable for treatment/purification of liquid, such as waste water, comprising biological matter. The plant 1 comprises a basin 2, configured to house the liquid to be treated.

In the disclosed embodiments the plant is constituted by a treatment plant and the description hereinbelow is written using the term treatment plant, but it shall be realized that other equivalent plants are included if nothing else is stated. Thereto the basin 2 is constituted by a circulation channel in the disclosed embodiments and the description hereinbelow is written using the term circulation channel, but it shall be realized that also basins that are not circulation channels are to be seen as equivalents and be included if nothing else is stated.

Thus, the treatment plant 1 comprises an endless circulation channel 2, or race track, configured to house the liquid to be treated. In the disclosed embodiment the circulation channel 2 is constituted by an oblong basin having rounded ends and comprising a centrally located longitudinal divider 3, the circulation channel 2 obtaining two parallel straight channel segments that are connected to each other by means of two direction changing/semi circular channel segments. The direction changing channel segments comprises in the disclosed embodiment guide walls 4 that facilitates the change of direction of the liquid flow. It shall be pointed out that circulation channels may present any other conceivable shape, for instance annular shape or serpentine shape, and thus the circulation channel may comprise several straight and direction changing channel segments, respectively, or may present an entirely circular/elliptic track shape.

The circulation channel 2 is adapted to house liquid/waste water up to a predetermined filling height/liquid level, even thus the actual liquid level during operation may be below as well as above said filling height without the present invention being effected appreciably. The waste water is purified either continuously or batch wise in an inventive treatment plant 1 and by having a waste water volume reaching up to said predetermined filling height an optimal utilization of the treatment plant 1 is obtained. A typical filling height is about 3-8 meters. During continuous treatment liquid is supplied continuously to the circulation channel 2 at the same time as liquid is removed continuously from the circulation channel 2. The input and the output during continuous treatment is a fraction of the circulating flow, usually about $1/30$-$1/20$ of the circulating flow. The circulation channel 2 is configured to have a predetermined flow direction, schematically shown by means of the arrow 5, along which the liquid is intended to flow.

Thereto the inventive treatment plant 1 comprises at least one flow generating machine 6 arranged in the circulation channel 2, usually two or more flow generating machines are located next to each other. The flow generating machine 6 is configured to generate a liquid flow flowing along said circulation channel 2, and may be constituted by one or more submergible mixer machines, often so-called slowly operated mixer machines having a propeller rotating at a rpm in the area less than 100 rpm, usually in the area 20-50 rpm. In some installations the treatment plant 1 comprises flow generating machines 6 at two or more locations, which preferably are mutually equidistantly arranged along the circulation channel 2. Preferably the flow generating machine 6 shall be located at a distance from a direction changing channel segment of the circulation channel 2 such that a counter force from the walls of the circulation channel 2 having effect on the flow generation machine 6 and negatively effecting the generation of the liquid flow does not arise.

Thereto the inventive treatment plant 1 comprises at least one equipment 7 that is arranged in the circulation channel 2 and that effects the momentum of the flowing liquid. The equipment 7 may be effected by the momentum of the liquid flow in a positive way, i.e. a momentum source adding speed to the liquid flow, or in a negative way, i.e. a momentum sink reducing the speed of the liquid flow. The equipment 7 may be a immovable equipment or a movable equipment, an active equipment or a passive equipment.

The inventive treatment plant 1 also comprises a control unit 8, that is operatively connected to said at least one flow generating machine 6 and control the operational speed N at which said flow generating machine 6 is to be driven, for instance by controlling the frequency of the current operating the flow generating machine 6. The control unit 8 may be constituted by an external control unit or a control unit integrated in the flow generating machine 6.

In the embodiment disclosed in FIG. 1 the equipment 7 is constituted by a mechanical surface aerator having a horizontal rotational axis. Such a mechanical surface aerator having a horizontal rotational axis comprises according to the embodiment disclosed in FIG. 1 a horizontal shaft 9 having blades/arms/brushes 10 protruding therefrom in the radial direction. The shaft 9 is preferably located in flush with or above the liquid level in the circulation channel 2. The mechanical surface aerator having horizontal rotational axis is in the disclosed embodiment arranged in the middle of a straight channel segment, however other locations are conceivable such as preferably in the beginning of a straight channel segment. Upon rotation of the horizontal shaft 9 the blades 10 bring the air above the liquid to be mixed with the liquid, in order to transfer oxygen ($O_2$) from the air to the waste water/liquid.

Figure 2:
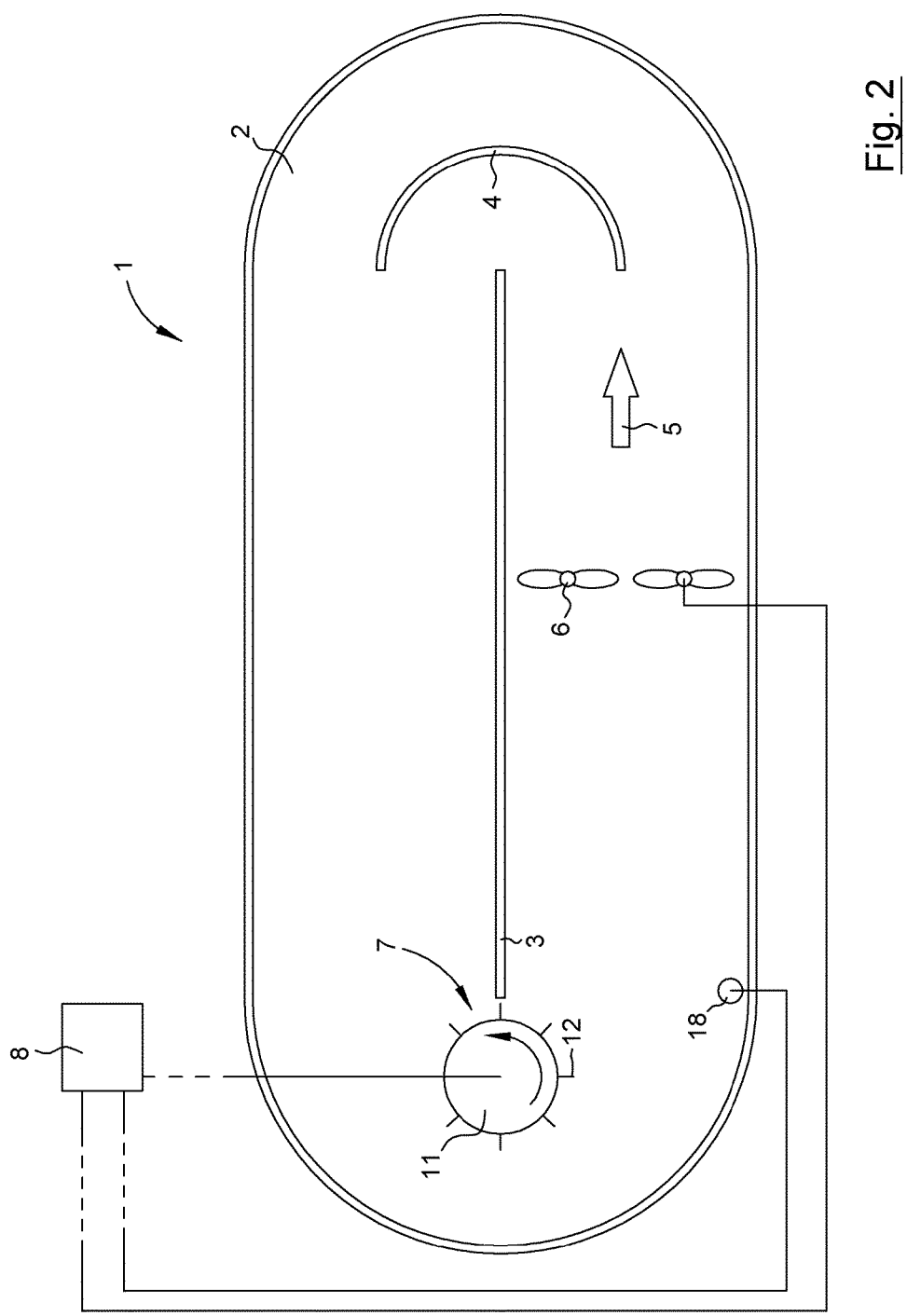
FIG. 2 is a schematic illustration of an inventive plant according to a second embodiment.

In the embodiment disclosed in FIG. 2 the equipment 7 is constituted by a mechanical surface aerator having a vertical rotational axis. Such a mechanical surface aerator having a vertical rotational axis comprises according to the disclosed embodiment a vertical shaft 11 having blades/arms 12 protruding therefrom in the radial direction, and/or having blades/arms protruding therefrom in the axial direction. The shaft 11 extend from a level above the liquid level in the circulation channel 2 to a level below the liquid level in the circulation channel 2 as in the disclosed embodiment, or is preferably located above the liquid level in the embodiment having axial blades/arms. The mechanical surface aerator having vertical rotational axis is in the disclosed embodiment arranged in a direction changing channel segment, however other locations are conceivable. Upon rotation of the vertical shaft 11 the blades 12 bring the air above the liquid to be mixed with the liquid, in order to transfer oxygen ($O_2$) from the air to the waste water/liquid.

Such mechanical surface aerators, i.e. horizontal and vertical, can effect the momentum of the flowing liquid in positive as well as negative direction, and preferably the mechanical surface aerator is operatively connected to the control unit 8 whereupon the operational speed/rotational speed of the mechanical surface aerator can be adjusted/altered, thereto it is conceivable to adjust/alter the submersible depth of the aerator. Other types of mechanical surface aerators are conceivable, but are not disclosed herein.

Figure 3:
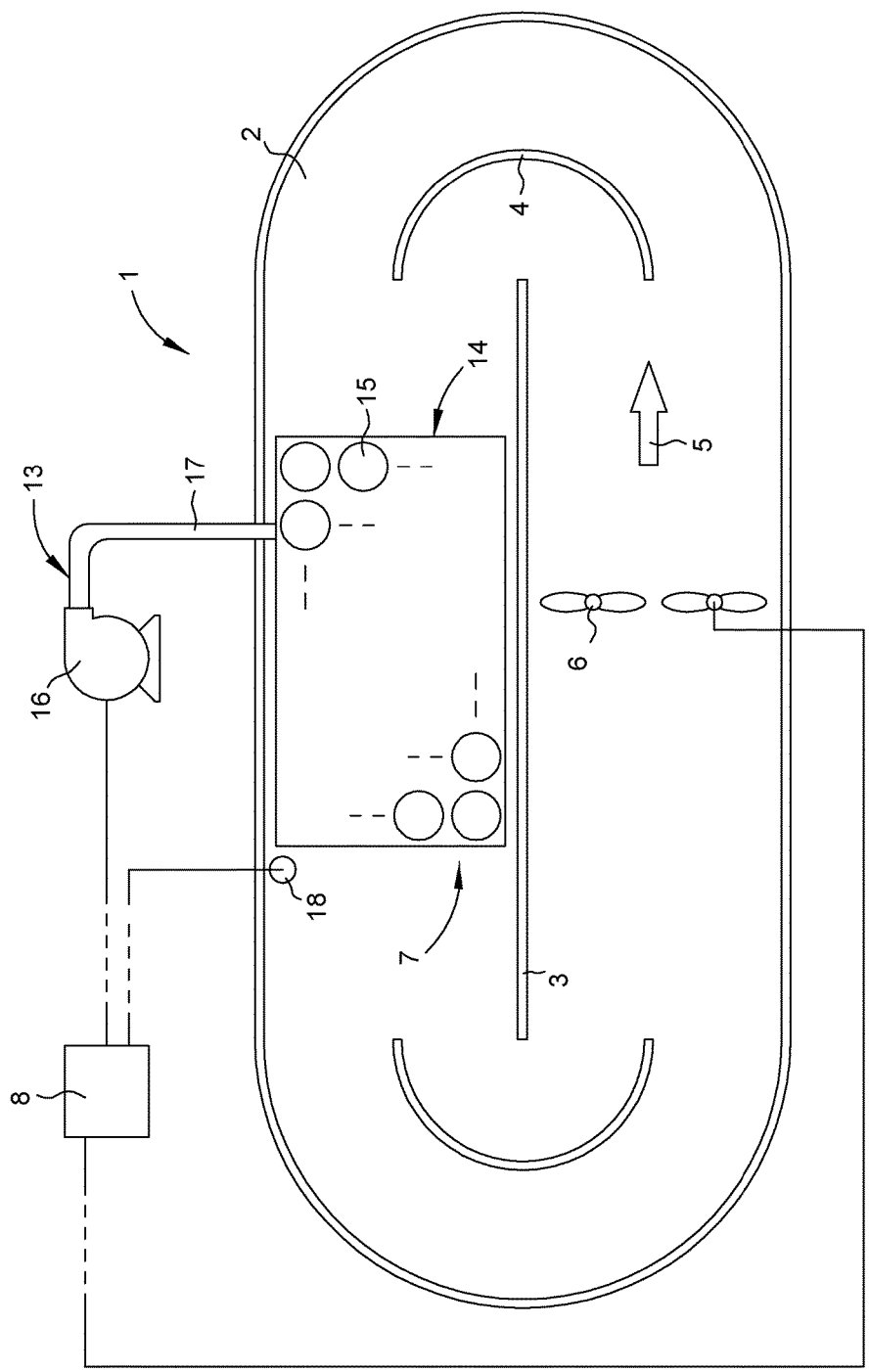
FIG. 3 is a schematic illustration of an inventive plant according to a third embodiment.

In the embodiment disclosed in FIG. 3 the treatment plant 1 comprises an aeration arrangement, generally designated 13, configured to provide a gas flow Q comprising oxygen to the liquid. The aeration arrangement 13 comprises preferably at least one aeration sector 14. The aeration sector 14 is in the disclosed embodiment arranged in the middle of a straight channel segment, however, also other locations are conceivable such as preferably in the beginning of a straight channel segment or along the entire length of a straight channel segment and/or in a direction changing channel segment. Said at least one aeration sector 14 is preferably arranged at the bottom of the circulation channel 2 and is configured to provide a gas flow Q from the aeration arrangement 13 to the liquid, in order to transfer oxygen ($O_2$) from the gas to the waste water/liquid. The gas flow Q is constituted by oxygen containing gas such as air, other oxygen containing gas mixture or pure oxygen. The aeration sector 14 is for instance constituted by a large number of diffusors or aerator members 15, preferably so-called fine bubble aerators, which together cover the entire or main part of the width of the circulation channel 2. The aeration arrangement 13 thereto comprises at least one blowing machine 16 that provides gas to the aeration sector 14 via a pipe system 17, the blowing machine 16 is preferably operatively connected to the control unit 8 whereupon the operational speed/rotational speed of the blowing machine 16 can be adjusted/altered. The aeration arrangement 13 can effect the momentum of the flowing liquid in positive as well as negative direction.

In an alternative not disclosed embodiment the equipment 7 is constituted by a so-called jet aerator/venture aerator. It suck up liquid and pump it out through a nozzle whereupon air from above the liquid level in the circulation channel 2 is sucked into the nozzle and is mixed with the pumped liquid. A jet aerator effect the momentum of the flowing liquid in positive direction.

It shall be realized that an equipment 7 not necessarily need to be constituted by an aerator, but can for instance be constituted by a plate or other stationary inactive equipment 7 located in the circulation channel 2. The equipment may for instance also be constituted by a pump device configured to raise/lower the liquid level in the basin.

Reference is now made to FIG. 1, however it shall be realized that it correspondingly also applies to other embodiments if nothing else is stated.

In an optimal embodiment a homogenous uniform liquid flow reach the mechanical surface aerator 7 and the liquid flow reaching the flow generating machine 6 is free from gas bubbles and gas flow induced currents. Preferably the distance between the mechanical surface aerator 7 and the flow generating machine 6 is at least as big as the distance between the flow generating machine 6 and the mechanical surface aerator 7 seen in the flow direction 5, such that the operation of the mechanical surface aerator 7 effects the flow generating machine 6 as little as possible.

It is essential for the present invention that he method for controlling the plant 1, comprises the steps of in the control unit 8 store a predetermined relationship between the operational speed N of the flow generating machine 6 and an operational parameter P from which the torque M of the flow generating machine 6 may be derived, which relationship depends on a predetermined liquid flow speed V in the basin 2 at the flow generating machine 6, determining the operational speed N of the flow generating machine 6, from the determined operational speed N determining a set value of the operational parameter P of the flow generating machine 6 based on said relationship between the operational speed N of the flow generating machine 6 and the operational parameter P of the flow generating machine 6, by means of the control unit 8 determining a real value of the operational parameter P of the flow generating machine 6, and by means of the control unit 8 adjusting the operational speed N of the flow generating machine 6 if the real value of the operational parameter P of the flow generating machine 6 is different than the set value of the operational parameter P of the flow generating machine 6.

The relationship between the operational speed n of the flow generating machine 6 and the operational parameter P of the flow generating machine 6, for the respective liquid flow speed V, is preferably stored in the control unit 8. It shall be pointed out that the operational speed N of the flow generating machine 6 in an alternative, completely equivalent, way can be expressed as the operational rpm or the electrical drive frequency of the flow generating machine 6 without effecting the present invention.

The operational parameter P of the flow generating machine 6 comprises preferably the torque M of the flow generating machine 6 and/or the current I that the flow generating machine 6 consume during operation. It shall be realized that also other operational parameters P, from which the torque of the flow generating machine 6 can be derived, are conceivable and are included in the term operational parameter.

Thus, the step of by means of the control unit 8 determine a true value of the operational parameter P of the flow generating machine 6, preferably comprises measurement of the current consumption of the flow generating machine 6, from which the torque M of the flow generating machine 6 can be derived. The current/power consumption of the flow generating machine 6 is thus an equivalent expression for the torque M of the flow generating machine 6. Upon measurement of the current/power consumption the control unit 8 preferably comprises a filtration of the current signal in order for the operational speed N of the flow generating machine 6 shall not be effected by quick load variations for instance originating from solid matter comprised in the liquid, turbulence, etc.

According to the disclosed embodiments the operational speed N of the flow generating machine 6 shall be increased if the true value of the torque M of the flow generating machine 6 is greater than the set value of the torque M of the flow generating machine 6, and the operational speed N of the flow generating machine 6 shall be decreased if the true value of the torque M of the flow generating machine 6 is less than the set value of the torque M of the flow generating machine 6.

According to one embodiment the liquid flow speed V along the circulation channel 2 is constant independently of the operational speed N of the flow generating machine 6. According to an alternative embodiment the liquid flow speed V along the circulation channel 2 varies as a function of the operational speed N of the flow generating machine, for instance the liquid flow speed V decrease when the operational speed N of the flow generating machine 6 decrease.

Preferably the operational speed N of the flow generating machine 6 is always higher than a predetermined lowest allowable operational speed $N_{min}$. At operational speeds lower than the lowest allowable operational speed $N_{min}$ the liquid flow risk to be not homogenous enough but solid matter will accumulate on the bottom of the circulation channel 2 at the same time as the liquid flow speed V of the liquid flow risk to be too low for achieving the requested process results for the specific treatment plant 1. Thereto it is preferable that the operational speed N of the flow generating machine 6 always is lower than a predetermined highest allowable operational speed $N_{max}$, in order not to risk that the flow generating machine 6 is overloaded.

The treatment plan 1 can also, as a complement to the present invention, comprise direct or indirect measurement of the oxygen transfer rate to the liquid and/or the level of dissolved oxygen in the liquid, and thereby an indication whether the oxygen transfer rate need to be increased or decreased. According to the most preferred embodiment the dissolved oxygen level is measured directly. An increase in the oxygen transfer rate is applicable when the dissolved oxygen level in the liquid is too low, and a decrease of the oxygen transfer rate is applicable when the dissolved oxygen level in the liquid is too high. In order to measure/determine the dissolved oxygen level in the liquid the treatment plant 1 preferably comprises an oxygen sensor 18 located at a predetermined location in the circulation channel 2. The oxygen sensor 18 is operatively connected to the control unit 8. The oxygen sensor 18 is preferably located in the area directly downstream the aerator seen in the flow direction 5 along the circulation channel 2. However, other locations of the oxygen sensor 18 are conceivable.

FEASIBLE MODIFICATIONS OF THE INVENTION

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A method for controlling a plant for treatment of waste water, wherein the plant comprises:
    a basin constituted by a circulation channel and configured to contain waste water,
    at least one flow generating machine constituted by a submerged mixer machine that is arranged in the basin and configured to generate a liquid flow in the basin,
    equipment arranged in the basin and that effects a momentum of the waste water flowing along the circulation channel, wherein an operational speed N of the flow generating machine is (i) higher than a predetermined lowest allowable operational speed Nmin to prevent solid matter from accumulating on a bottom of the basin, and (ii) lower than a predetermined highest allowable operational speed Nmax to prevent the flow generating machine from becoming overloaded, and
    a control unit that is operatively connected to said at least one flow generating machine, the method including the steps of:

storing a predetermined relationship in the control unit between the operational speed N of the flow generating machine and an operational parameter P, which predetermined relationship depends on a predetermined liquid flow speed V in the basin at the flow generating machine, the operational parameter P being defined as either the torque M of the flow generating machine or an operational parameter from which a torque M of the flow generating machine may be derived, determining the operational speed N of the flow generating machine, determining a set value of the operational parameter P of the flow generating machine from the determined operational speed N, the set value based on said predetermined relationship between the operational speed N of the flow generating machine and the operational parameter P of the flow generating machine, determining a real value of the operational parameter P of the flow generating machine using the control unit by measuring a parameter from which the torque M of the flow generating machine can be derived, and adjusting the operational speed N of the flow generating machine using the control unit if the real value of the operational parameter P of the flow generating machine is different than the set value of the operational parameter P of the flow generating machine.

2. The method according to claim 1, wherein the plant comprises a treatment plant for treatment of waste water.

3. The method according to claim 1, wherein the operational parameter P comprises the torque M of the flow generating machine.

4. The method according to claim 1, wherein the operational parameter P comprises a current I consumed by the flow generating machine.

5. The method according to claim 1, wherein the operational speed N of the flow generating machine is increased if the real value of the operational parameter P of the flow generating machine is greater than the set value of the operational parameter P of the flow generating machine.

6. The method according to claim 1, wherein the operational speed N of the flow generating machine is decreased if the true real value of the operational parameter P of the flow generating machine is less than the set value of the operational parameter P of the flow generating machine.

7. The method according to claim 1, wherein said equipment comprises a mechanical surface aerator.

8. The method according to claim 7, wherein the mechanical surface aerator comprises a horizontal rotational axis.

9. The method according to claim 7, wherein the mechanical surface aerator comprises a vertical rotational axis.

10. The method according to claim 1, wherein said equipment comprises an aeration sector arranged at a bottom of the basin.

* * * * *